United States Patent
Bychkov et al.

(10) Patent No.: US 7,035,949 B2
(45) Date of Patent: Apr. 25, 2006

(54) MULTIPURPOSE PROCESSOR, SYSTEM AND METHOD

(75) Inventors: Eyal Bychkov, Hod Hasharon (IL);
Amir Ban, Ramat Hasharon (IL)

(73) Assignee: M-System Flash Dist Pioneers Ltd., Kfar Saba (IL)

( * ) Notice: Subject to any disclaimer, the term of this patent is extended or adjusted under 35 U.S.C. 154(b) by 121 days.

(21) Appl. No.: 10/206,117

(22) Filed: Jul. 29, 2002

(65) Prior Publication Data
US 2004/0019716 A1 Jan. 29, 2004

(51) Int. Cl.
*G06F 13/12* (2006.01)
(52) U.S. Cl. .............................. 710/63; 710/8; 710/13; 710/64; 710/301; 710/303
(58) Field of Classification Search .................... 710/8, 710/13, 62–64, 72, 301–304
See application file for complete search history.

(56) References Cited

U.S. PATENT DOCUMENTS

| | | | |
|---|---|---|---|
| 5,999,952 A * | 12/1999 | Jenkins et al. ............. 708/100 |
| 6,182,204 B1 * | 1/2001 | Nakashima .................. 712/38 |
| 6,256,690 B1 * | 7/2001 | Carper ........................ 710/301 |
| 6,266,539 B1 * | 7/2001 | Pardo ....................... 455/556.2 |
| 6,272,575 B1 * | 8/2001 | Rajchel ....................... 710/301 |
| 6,518,724 B1 * | 2/2003 | Janik ........................... 320/115 |
| 6,572,015 B1 * | 6/2003 | Norton ....................... 235/382 |
| 6,757,551 B1 * | 6/2004 | Newman et al. ......... 455/556.1 |
| 6,779,115 B1 * | 8/2004 | Naim .......................... 713/192 |
| 2001/0037420 A1* | 11/2001 | Sakamoto ................... 710/102 |
| 2002/0162884 A1* | 11/2002 | Speas et al. ................ 235/380 |

* cited by examiner

*Primary Examiner*—Kim Huynh
*Assistant Examiner*—Alan S. Chen
(74) *Attorney, Agent, or Firm*—Mark M. Friedman

(57) ABSTRACT

A data storage and processing device is reversibly attachable to a selected member of a set of appliances. The device includes a data storage medium and a processor. Each appliance includes appropriate functional components, a power source and a user interface. The device receives power from the attached appliance. Commands for operating the attached appliance are stored in the data storage medium and are executed by the processor in response to user instructions received from the attached appliance in order to operate the functional components. Preferably, the device receives power only from the attached appliance, and the functional components are operated, in response to the user instructions, only by the device's processor.

39 Claims, 5 Drawing Sheets

US 7,035,949 B2

MULTIPURPOSE PROCESSOR, SYSTEM AND METHOD

FIELD AND BACKGROUND OF THE INVENTION

The present invention relates to portable data processors, and specifically to programmable data processors for performing a variety of applications with a corresponding variety of attachable appliances.

Many portable consumer and professional appliances employ both a processor and memory of large capacity, for instance digital cameras, MP3 players, digital voice recorders, PDAs (personal digital assistants), etc. Often the cost of the memory and processor represents a substantial percentage of the overall cost of the appliance. Thus a user who buys a variety of such appliances will pay several times for a multiplicity of similar hardware components.

Some vendors have introduced add-on modules that add functionality to their core product. For example, there are commercial products that allow attaching a digital camera accessory or voice recorder accessory to a personal data assistant (PDA). The user of the PDA then can take photographs with his new accessory, but must also carry his PDA when he needs to take photos even if he does not need the PDA functionality on that occasion.

There are commercial detachable memory modules of various forms, features and capacities. Some can be connected to a variety of devices and appliances, e.g. the same Compact Flash card can be used with a personal computer, a PDA, a GPS navigator, a digital camera or an MP3 player. Most of these modules have nonvolatile memories, and some of these modules also include data processors for managing the efficiency and/or security of the access to the memory. This processing power, however, is limited in the prior art to the functionality of the memory module alone. Also, the role of the detachable memory module is to carry data, while the device or appliance which accepts such a detachable memory module has its own data processor and operates from program code recorded in its own, fixed memory.

Thus, the prior art has not exploited the potential of the storage capacity and processing power of detachable modules for operating a variety of devices and appliances.

SUMMARY OF THE INVENTION

The present invention uses the processing power of a detachable memory module to operate an appliance that accepts the memory module. Because of the importance of the processing power in such a memory module in the context of the present invention, the memory module of the present invention generally is referred to herein as a "data storage and processing device".

The present invention maximizes the multipurpose functionality of the memory module by including at least data processing capability and memory capacity for storing and running the program code. In order to customize this universal module to a specific application, the memory module is attached to an external source, such as a personal computer or a mobile communication device, and downloads therefrom the program code that is retrieved from a CD or is downloaded from the Internet or a mobile operator server. After downloading the software into the memory module, the module is connected, physically, logically and often also electrically to the matching appliance. For example if a functionality of a digital camera is sought, then the memory module receives the software covering the various functions of a digital camera, and a digital camera appliance, having a minimal set of optical, sensing and control features, is attached to the memory module and is operated from the module's data processor under the software code downloaded thereto. A battery is included in the appliance.

Subsequently, the memory module may be unplugged from the digital camera appliance and connected to a computer for downloading digital recorder software. Depending on the memory capacity of the memory module, the digital camera software may remain in the memory for future use, or else may be erased to free memory space if needed. Now the memory module that includes the digital recorder software is attached to a digital recorder appliance with minimal functions such as microphone, loudspeaker and operational controls. Hence, the integrated device becomes a fully functional digital recorder, utilizing the same memory and processing power used beforehand for the digital camera, and without the need to carry the digital-camera-related hardware unnecessarily, when just sound recording is sought.

The order of downloading the software and attaching the appliance can be reversed, by first making the attachment and then downloading the software. However, it could be advantageous to use the same communication port for connecting to the personal computer and then communicating with the appliance, which makes the first option, i.e., downloading first and only then attaching the appliance, preferable in many cases.

Therefore:

According, to the present invention there is provided a data storage and processing device including: (a) a data storage medium for storing commands for operating a functional component of an appliance external to the data storage and processing device; (b) a processor for managing the data storage medium and for executing the commands so as to operate the functional component; and (c) a first communication interface for reversibly connecting the appliance to the data storage and processing device to provide operating power to the processor from the appliance and to allow the processor to operate the functional component.

According to the present invention there is provided a data storage and processing device including: (a) a data storage medium for storing commands for operating a functional component of an appliance external to the data storage and processing device; (b) a processor for managing the data storage medium and for executing the commands so as to operate the functional component; and (c) a first communication interface for reversibly connecting the appliance to the data storage and processing device to provide user instructions to the processor from the appliance and to allow the processor to operate the functional component in response to the user instructions.

According to the present invention there is provided an appliance including: (a) at least one functional component; (b) a communication interface for reversibly connecting the appliance to a data storage and processing device external to the appliance; and (c) a power source for providing power to the at least one functional component; wherein while the appliance is connected to the data storage and processing device, the power source provides power to the data storage and processing device via the communication interface and the data storage and processing device operates the at least one functional component via the communication interface.

According to the present invention there is provided an appliance including: (a) at least one functional component;

(b) a user interface for entering user instructions; and (c) a communication interface for reversibly connecting the appliance to a data storage and processing device external to the appliance; wherein, while the appliance is connected to the data storage and processing device, the appliance sends the user instructions to the data storage and processing device via the communication interface and the data storage and processing device operates the at least one functional component via the communication interface in response to the user instructions.

According to the present invention there is provided a system including: (a) at least one appliance, each appliance including: (i) at least one respective functional component, (ii) a respective power source, and (iii) a respective appliance housing wherein the respective functional component and the respective power source are housed; and (b) a data storage and processing device, including: (i) a data storage medium for storing commands for operating the functional components, (ii) a processor for managing the data storage medium and for executing the commands so as to operate the functional components, (iii) a first communication interface for reversibly connecting a selected one of the at least one appliance to the data storage and processing device to provide power to the processor from the respective power source of the selected appliance and to allow the processor to operate the at least one respective functional component of the selected appliance; and (iv) a data storage and processing device housing, separate from the respective housing of each of the at least one appliance, wherein the data storage medium and the processor are housed.

According to the present invention there is provided a system including: (a) at least one appliance, each appliance including: (i) at least one respective functional component, (ii) a respective user interface for entering user instructions, and (iii) a respective appliance housing wherein the respective functional component and the respective power source are housed; and (b) a data storage and processing device, including: (i) a data storage medium for storing commands for operating the functional components, (ii) a processor for managing the data storage medium and for executing the commands so as to operate the functional components, (iii) a first communication interface for reversibly connecting a selected one of the at least one appliance to the data storage and processing device to send the user instructions from the respective user interface of the selected appliance to the processor and to allow the processor to operate the at least one respective functional component of the selected appliance in response to the user instructions; and (iv) a data storage and processing device housing, separate from the respective housing of each of the at least one appliance, wherein the data storage medium and the processor are housed.

According to the present invention there is provided a method of operating an appliance that responds to a plurality of commands, including the steps of: (a) providing a data storage and processing device that includes: (i) a data storage medium for storing the commands (ii) a processor for managing the data storage medium and for executing the commands so as to operate the appliance, and (iii) a first communication interface for reversibly connecting the appliance to the data storage and processing device to allow the processor to operate the appliance; (b) connecting the appliance to the data storage and processing device, using the first communication interface; (c) providing power to the processor from the appliance via the first communication interface; and (d) executing the commands, by the processor.

According to the present invention there is provided a method of operating an appliance that responds to a plurality of commands, including the steps of: (a) providing a data storage and processing device that includes: (i) a data storage medium for storing the commands, (ii) a processor for managing the data storage medium and for executing the commands so as to operate the appliance, and (iii) a first communication interface for reversibly connecting the appliance to the data storage and processing device to allow the processor to operate the appliance; (b) connecting the appliance to the data storage and processing device, using the first communication interface; (c) providing user instructions to the processor from the appliance via the first communication interface; and (d) executing the commands in response to the user instructions, by the processor.

A system of the present invention includes two major elements: one or more appliances, and a data storage and processing device.

Each appliance includes at least one respective functional component, and usually more than one respective functional component. For example: If the combination of an appliance and the data storage processing device is intended to be an MP3 player, then the appliance's functional components include an MP3 decompression circuit for converting digital data-stored as MP3 files in the data storage and processing device to corresponding analog audio signals and an amplifier for amplifying the audio signals. If the combination of an appliance and the data storage processing device is intended to be a digital audio recorder, then the appliance's functional components include a microphone for capturing audio signals and a circuit for digitizing and compressing the audio signals to produce digital data to be stored in the data storage and processing device, for decompressing the digital data upon retrieval of the digital data from the data storage and processing device, and for converting the decompressed digital data into analog signals. If the combination of an appliance and the data storage processing device is intended to be a digital camera, then the appliance's functional components include a CCD array for capturing an image and converting the image to a digital representation thereof that is stored in the data storage and processing device, and a circuit for compressing the digital representation prior to storing the digital representation in the data storage and processing device.

Each appliance also includes: either a power source for providing power to its functional components, or a user interface for entering user instructions, or preferably both the power source and the user interface. Each appliance also includes a communication interface for reversibly connecting the appliance to the data storage and processing device. While the appliance is connected to the data storage and processing device, the power source provides power to the data storage and processing device via the communication interface, the appliance sends user instructions received via the user interface to the data storage and processing device via the communication interface, and the data storage and processing device operates the functional components of the appliance via the communication interface in response to the user instructions.

The data storage and processing device includes a data storage medium for storing commands for operating the functional components of the appliances, a processor for managing the data storage medium and for executing the commands so as to operate the functional components of the appliances, and a first communication interface for reversibly connecting the data storage and processing device to a selected one of the appliances at the appliance's communication interface.

The processor is the component of the data storage and processing device that operates the functional components of an attached appliance in response to user instructions received from the attached appliance. Preferably, only the processor of the data storage and processing device operates the functional components of the attached appliance in response to the user instructions. The appliance may have its own processor, for example for performing housekeeping functions, but the appliance's processor is not involved in responding to the user instructions.

Preferably, while an appliance is attached to the data storage and processing device, the data storage and processing device receives operating power only from the appliance.

Preferably, the data storage medium includes at least one flash memory module.

Preferably, the communication interfaces of the appliances and the first communication interface of the data storage and processing device all include respective USB connectors.

Preferably, the data storage and processing device is operative to receive the commands from a software loading device via the first communication interface. Alternatively, the data storage and processing device also includes a second communication interface for receiving the commands from the software loading device. Preferably, the second communication interface includes an infrared port.

The appliances all are external to the data storage and processing device, in the sense that, although the appliances can be reversibly attached to the data storage and processing device, the appliances and the data storage and processing device are otherwise physically separate entities. The data storage and processing device and the appliances all have their own respective, physically separate housings for housing their respective components.

The scope of the present invention also includes a method for operating an appliance such as the appliances described above. The method steps include providing a data storage and processing device as described above, connecting the appliance to the data storage and processing device via the first communication interface, providing power and/or user instructions to the processor of the data storage and processing device from the appliance via the first communication interface, and having the processor of the data storage and processing device execute the commands stored in the data storage medium of the data storage and processing device in response to the user instructions so as to operate the appliance.

Preferably, power is provided to the processor only from the appliance and only via the first communication interface. Preferably, in response to the user instructions, only the processor of the data storage and processing device operates the appliance.

Preferably, the method of the present invention also includes the step of loading the commands into the data storage medium, preferably by connecting the data storage and processing device to a software loading device wherein the commands are stored, and copying the commands from the software loading device to the data storage medium. Preferably, the data storage and processing device is connected to the software loading device using the data storage and processing device's first communication interface.

Alternatively, the data storage and processing device is provided with a second communication interface for connecting the data storage and processing device to the software loading device. Preferably, the data storage and processing device is connected to the appliance before the data storage and processing device is connected to the software loading device, and the commands to be copied are selected based on the nature of the appliance that is connected to the data storage and processing device.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a portable multipurpose data storage and processing device which can be reversibly attached to an appliance to operate the appliance, of such an appliance that also provides user instructions and power to the data storage and processing device, and of the integrated unit constituted by the combination of the data storage and processing device and one such appliance.

The principles and operation of a portable multipurpose data storage and processing device according to the present invention may be better understood with reference to the drawings and the accompanying description.

Figure 1:
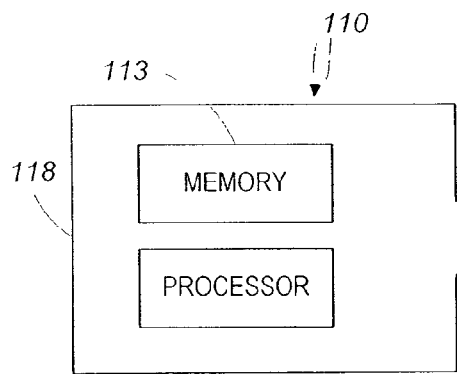
FIG. 1 is a schematic block diagram of a multipurpose data storage and processing device.
Figure 2:
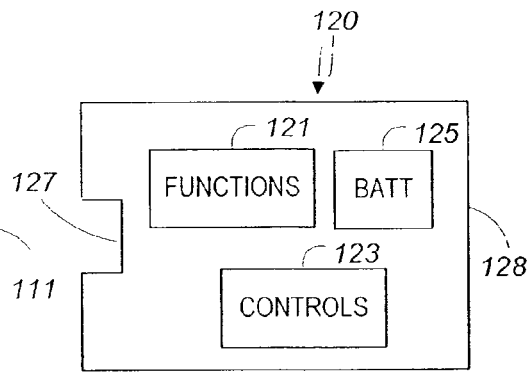
FIG. 2 is a schematic block diagram of a generalized appliance.
Figure 3:
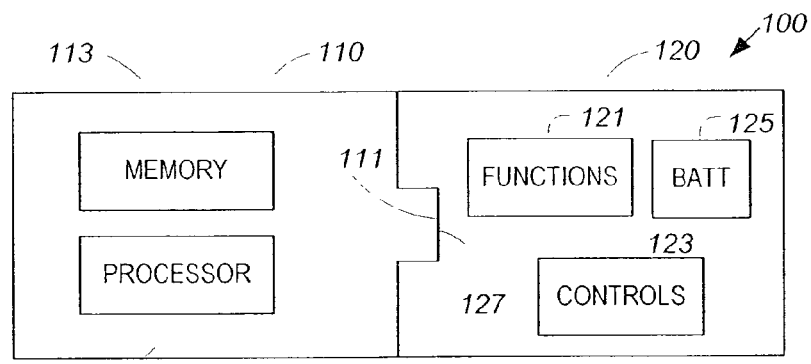
FIG. 3 is a schematic block diagram of the device of FIG. 1 and the appliance of FIG. 2 reversibly connected to form an integrated unit.

Referring now to the drawings, FIG. 1 illustrates a first preferred embodiment 110 of the portable multipurpose data storage and processing device of the present invention FIG. 2 illustrates an appliance 120 of the present invention; and FIG. 3 illustrates the combination of the two as an integrated unit 100 of the present invention. Device 110 includes a non-volatile memory module 113 and a data processor 112. Non-volatile memory module 113 contains software code and data needed for the operation of the functional components 121 of appliance 120. Data processor 112 contains processing power that cooperates with functional components 121 to operate appliance 120 by sending thereto action codes. (As understood herein, an action code is an operation code that is sent from a processor such as processor 112 to an appliance such as appliance 120 in order to activate the appliance in accordance with a master program.) Appliance 120, for example, a digital voice recorder, contains a set of functional components 121, in this example, a microphone, a loudspeaker, control buttons in a user interface 123, record/playback LED indicator, and sound compression-decompression circuitry. In another exemplary embodiment, appliance 120 is a digital camera accessory whose functional components 121 include lenses, a CCD sensor, control buttons in a user interface 123, a viewfinder, and picture compression circuitry. A power source (battery) 125 is included in appliance 120 to energize both device 110 and appliance 120 upon operation. Device 110 also includes, as a data communication interface, a connector 111. Appliance 120 also includes, as a data communication interface, a connector 127. Connector 111 and its counterpart connector 127, for example standard male and female USB (universal serial bus) connectors, are used for physically, electrically and logically connecting units 110 and 120 to form integrated unit 100 of FIG. 3. Thus, when device 110 is reversibly connected to appliance 120 as illustrated in FIG. 3, battery 125 energizes memory 113, data processor 112 and functional components 121, to allow functional components 121 to be operated by processor 112 according to program code stored in memory 113. Thus, unit 100 becomes a fully functional integrated unit. The specific functionality of integrated unit 100 is determined by the specific functions included in functional components 121 and the corresponding program code stored in memory 113. Examples of such integrated units include digital sound recorders, digital cameras and MP3 players.

The components of device 110 and appliance 120 are housed in their respective, physically separate housings 118 and 128. Memory 113 and data processor 112 are housed in housing 118 of device 110. Functional components 121, power source 125 and user interface 123 are housed in housing 128 of appliance 120.

Preferably, memory 113 is a flash memory that includes one or more flash memory modules. In fact, device 110 is most advantageously a prior art flash memory device, for example the DiskOnKey™ of M-Systems, Kfar Saba, Israel, with its processor modified to operate appliance 120 in response to user instructions received from appliance 120. Note that, like a conventional flash memory device, device 110 lacks an on-board power source and receives all operating power from the device (appliance 120) to which it is reversibly attached.

It will be appreciated that while the present invention mandates the usage of software code from memory 113 and processing power from data processor 112 for the operation of functional components 121, functional components 121 may included some processing power and memory and software code of their own for dedicated functions, e.g. for fast compression and decompression of sound or visual data. The function of data processor 112 is to mediate between functional components 121 and user instructions received via controls 123. Preferably, only data processor 112, and not any of the processors that may otherwise be part of appliance 120, operates functional components 121 in response to the user instructions received via controls 123.

Figure 4:
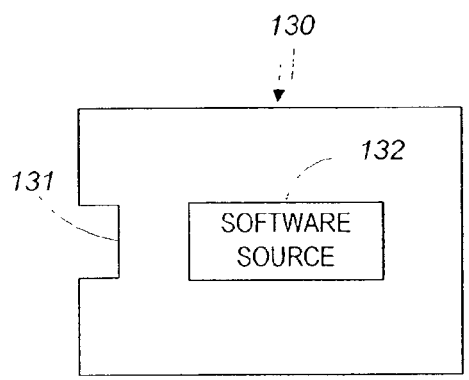
FIG. 4 is a schematic block diagram of a software loading device.

FIG. 4 is a schematic block diagram of a software loading device 130, for example a personal computer (PC). PC 130 includes a software source 132, that can be in one embodiment a CD-ROM disk provided with a selection of software modules, and in another embodiment software downloaded via the Internet and stored on the PC's hard disk. PC 130 also includes, as a data communication interface, a connector 131 that is adapted to receive connector 111 of device 110 of FIG. 1, e.g. a USB connector, and as needed, to energize device 110 from the power supply (not shown) of PC 130. Then, the user of PC 130 can select, by using the keyboard and screen (not shown) of PC 130, the preferred software module from software source 132, which is then copied into memory 113. After this software download process, device 110 is detached from device 130, and is now ready to be connected to an appropriate appliance 120 that contains functions that correspond to the software just downloaded into memory 113.

Software loading device 130 of FIG. 4 can be also a cellular telephone, a wireless PDA (personal digital assistant) and the like.

Figure 5:
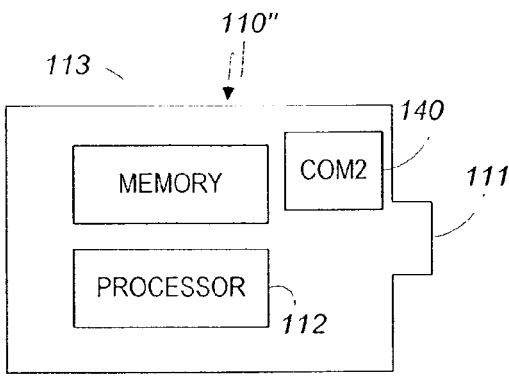
FIG. 5 is a schematic block diagram of another multipurpose data storage and processing device.

FIG. 5 illustrates another preferred embodiment 110″ of the portable multipurpose data storage and processing device of the present invention. In embodiment 110″, a second communication port 140, e.g. an IR (infrared) link, is provided, in addition to the communication port that forms part of connector 111. For example, while the communication port in USB connector 111 is used for coupling the memory and processor of device 110″ with functional components 121 of appliance 120. IR communication port 140 is used conveniently to download software from a software loading device such as cellular phone or a PDA equipped with an IR link. This provides additional flexibility in communicating with a variety of devices, and also allows downloading software into device 110″ while device 110″ is already being coupled with an appliance 120. Furthermore, while appliance 120 and the software loading device are simultaneously communicating with device 110″, the software loading device can interrogate appliance 120 to determine the nature of appliance 120. The software loading device then downloads software specific to appliance 120.

Figure 6:
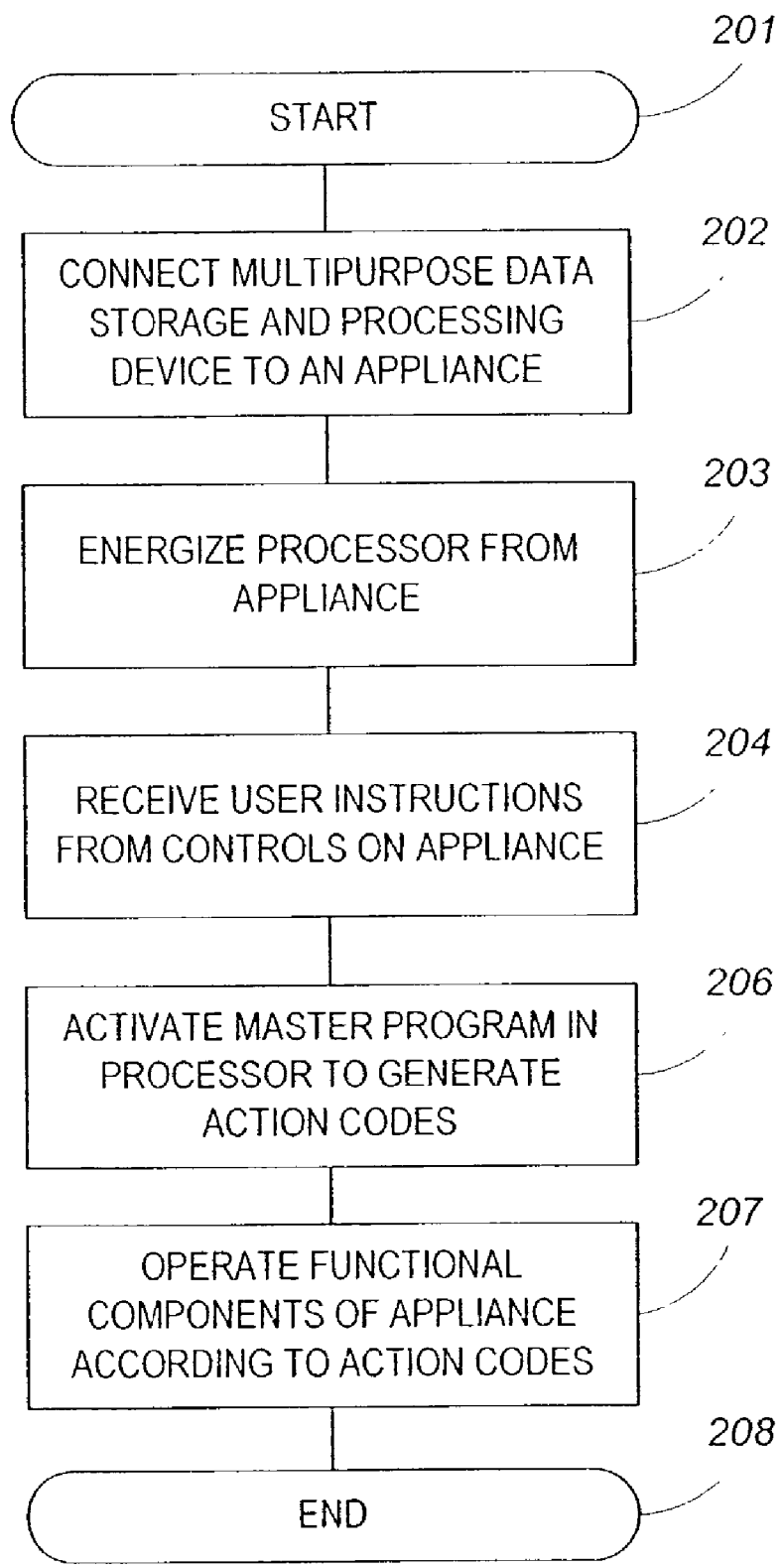
FIGS. 6, 7 and 8 are flow charts that illustrate the operation of the present invention.

Reference is now made to FIG. 6, with reference also to FIGS. 1, 2 and 3, to describe the operation of a preferred embodiment of the present invention. Starting at block 201, it is assumed that an application master program of a selected application, e.g. a digital voice recorder, is already installed in memory 113 of portable multipurpose data storage and processing device 110. In block 202, the corresponding appliance 120, in this example a digital voice recorder attachment, is reversibly attached to device 110, via USB connectors 111 and 127 that couple the two devices mechanically, electrically and electronically to form integrated unit 100 of FIG. 3. In block 203, processor 112 of device 110 is energized from battery 125 via coupling 111+121, and becomes live. In block 204, user instructions are entered via control buttons 123 on appliance 120, for instance "record". This instruction is received by processor 112 operated, in block 206, under the master control program from memory 113, and transformed there, in block 206, to specific action codes needed to activate, in block 207, the appropriate functional components 121, e.g. microphone, automatic gain control, analog to digital converter, compression circuit, etc., to perform the desired recording. Similarly, in blocks 204, 206 and 207, pressing "stop" on controls 123 is received by processor 112 to generate the action codes that deactivate the microphone, automatic gain control, analog to digital converter, and compression circuit mentioned above.

Figure 7:
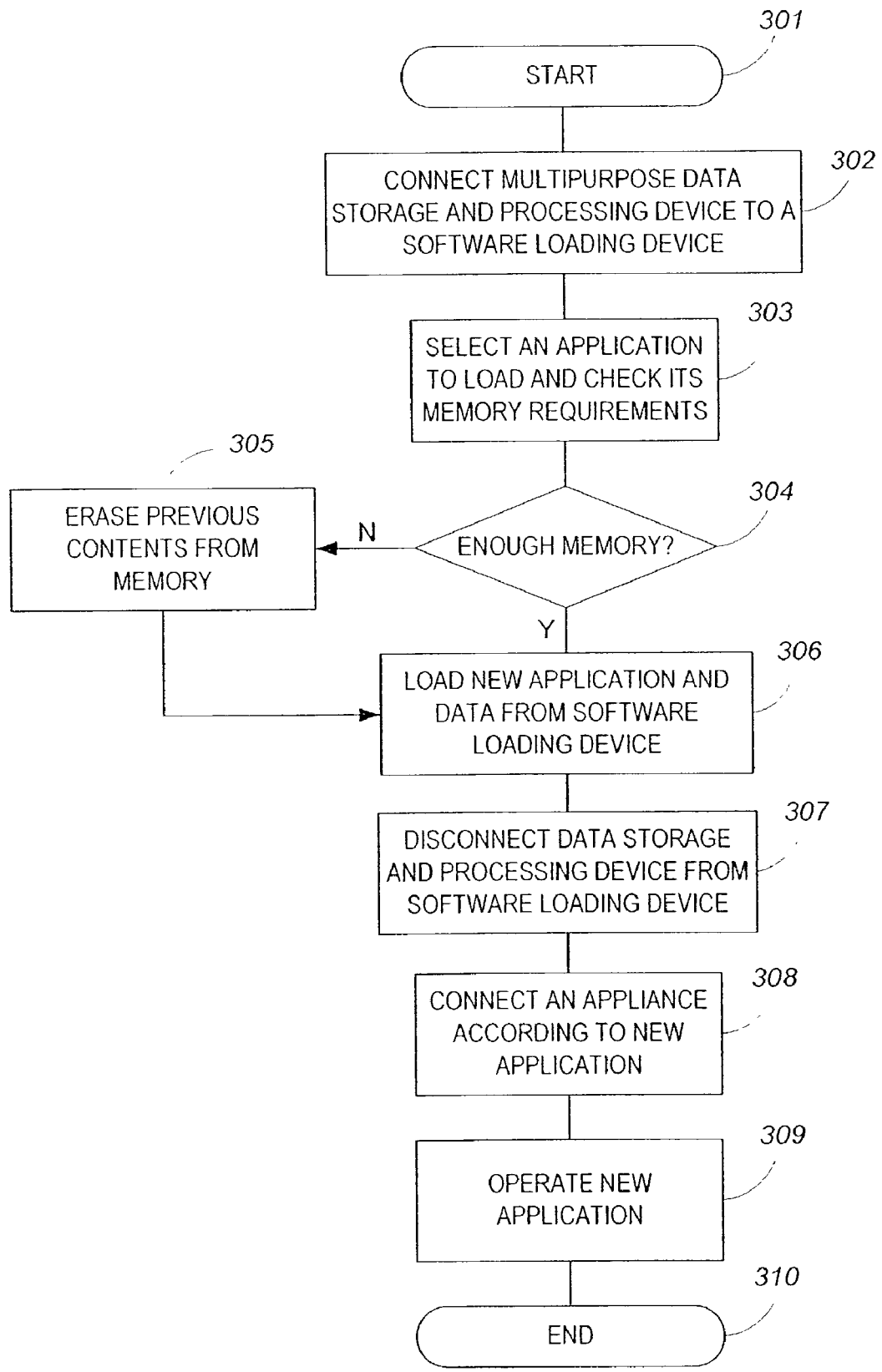

Reference is now made to FIG. 7, with reference also FIGS. 1, 2, 3 and 4, to describe a variation of the operation of a preferred embodiment of the present invention in respect to the sequence of software installation and physical attachment. When the procedure starts at block 301, memory 113 of unit 110 contains software code for a digital camera application from a previous loading session. In block 302 the user connects multipurpose data storage and processing device 110 through USB connectors 111 and 131 to a personal computer that serves as software loading device 130. Software source 132 contains software modules for a digital camera, digital voice recorder and MP3 player, previously downloaded from the Internet. In block 303 the user operates the keyboard of PC 130 to select an application of a digital voice recorder, identifying that 90 KB of memory are needed. In block 304, memory availability at memory 113 is checked by either processor 112 or PC 130, to determine whether the digital camera software currently residing in memory 113 can remain there for future use, or needs to be erased. According to the availability, the previous memory contents may be erased in block 304. In block 306 the digital recorder application is copied from software source 132 on PC 130 to memory 113 on device 110. In other applications, e.g. MP3 player, content data may also be loaded onto memory 113. In block 307, device 110 is disconnected from PC 130; and in block 308, device 110 is connected to a digital recorder appliance 120 to provide an integrated digital recorder unit 100. In block 309, digital recorder unit 100 is operated, where the functions of control buttons 123 and functional components (microphone and loudspeaker) 121 cooperate with the software code and storage capacity of memory 113 and processor 112, energized by battery 125.

Figure 8:
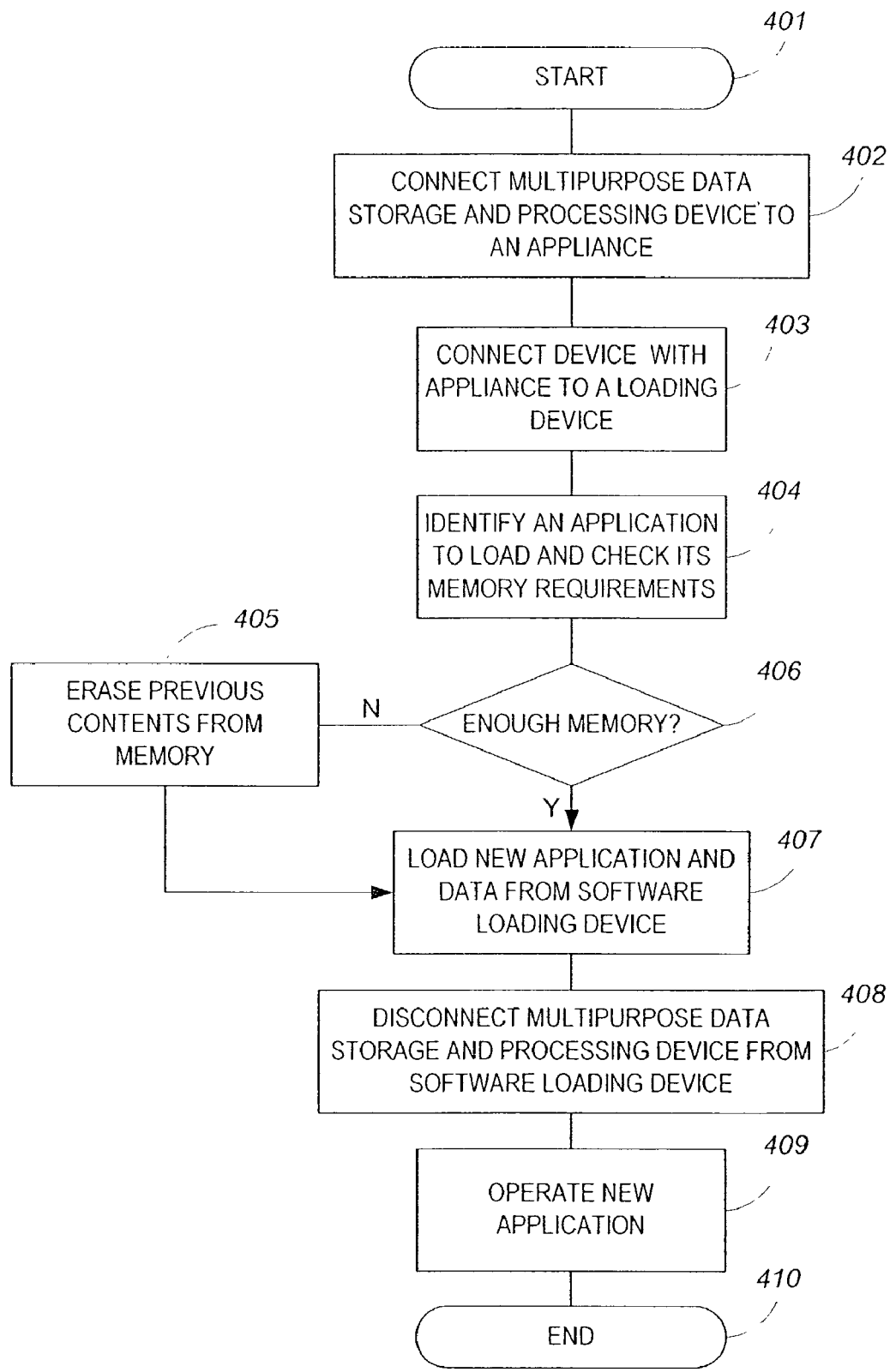

FIG. 8 illustrates an alternative operational mode to that of FIG. 7, with reference also to FIGS. 2. 4 and 5, wherein the selected appliance 120 is connected to multipurpose data storage and processing device 110" and only then is the appropriate software downloaded into memory 113. In block 401, a multipurpose data storage and processing device 110" contains in its memory 113 digital recorder software from a previous use. In block 402, device 110" is connected to appliance 120 of an MP3 player. In block 403, the integrated unit communicates via IR ports 140 and 131 to a cellular service provider via a mobile telephone unit 130, to select both the MP3 recorder software and music contents from the cellular service providers to memory 113 of device 110". In block 404, the cellular service provider interrogates appliance 120 via mobile telephone unit 130 to determine the nature of appliance 120 to ensure that the correct version of the MP3 recorder software is downloaded and to determine the memory requirements of that version. In block 406, the capacity of memory 113 is checked to identify whether memory 113 can accommodate the new software or content along with its previous contents of digital recorder software. If there is not enough space, the previous content is erased in block 405. Now the new application and content is loaded into memory 113 in block 407; in block 408 the integrated MP3 player is now separated from cellular phone 130, and in block 409 the integrated unit is operated.

Figure 9:
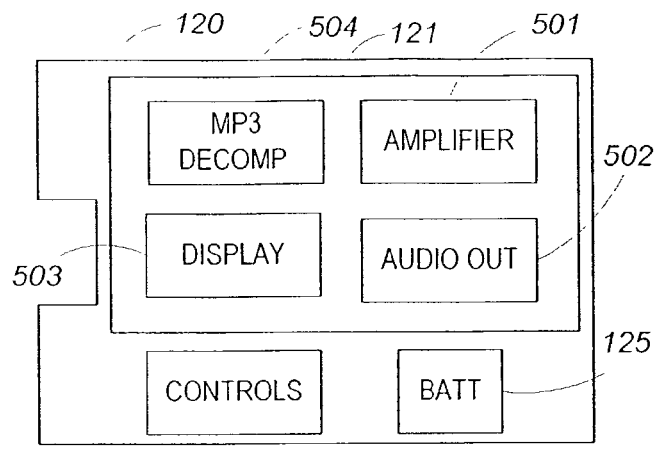
FIGS. 9, 10 and 11 are schematic block diagrams of specific appliances.

FIG. 9 illustrates schematically the main functional components 121 of an MP3 player embodiment of appliance 120. An MP3 decompression circuit 504 provides analog audio signals from MP3 files stored in memory 113 of FIG. 1. The analog signals are amplified by an amplifier 501, and are available to external headphones, not shown, via an audio socket 502. User controls 123 and a display 503 are used to make title selection, adjust tone and audio levels, etc.

Figure 10:
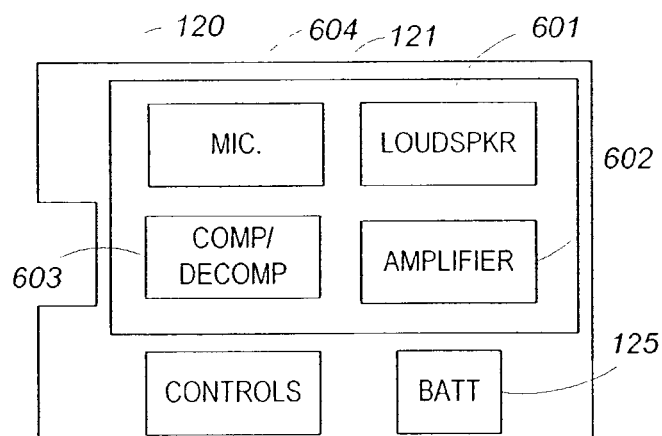

FIG. 10 illustrates schematically the main functional components 121 of a digital audio recorder embodiment of appliance 120. A microphone 604 captures audio signals, which are digitized and compressed by a circuit 603 prior to being stored in memory 113 as digital data. When later retrieved from memory 113, the digital data are decompressed and converted to analog signals by circuit 603 and amplified by an amplifier 602. The amplified audio signals are heard via a speaker 601. Controls 123 in this case include buttons for start/stop, record, replay, fast-forward and rewind, volume control, and gain control.

Figure 11:
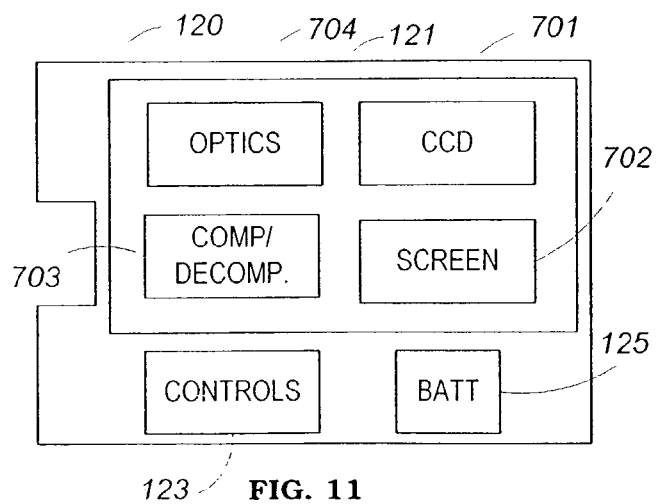

FIG. 11 illustrates schematically the main functional components 121 of a digital camera embodiment of appliance 120. Optics 704 include a zoom lens to create an image to be captured by a CCD array 701 that converts the image into digital representation of the image. The digital representation is compressed by a circuit 703 prior to being sent to memory 113 for storage. A screen 702 serves both as a viewfinder and a display for reviewing a picture from memory 113. Controls 123 include, in this embodiment, a zoom control, a shutter release, replay selection, etc.

While the invention has been described with respect to a limited number of embodiments, it will be appreciated that many variations, modifications and other applications of the invention may be made.

What is claimed is:

1. A system comprising:
    (a) a plurality of appliances, each said appliance including:
        (i) a respective functional component,
        (ii) a respective power source, and
        (iii) a respective appliance housing wherein said respective functional component and said respective power source are housed,
        each said functional component being different from any other said functional component; and
    (b) a data storage and processing device, consisting of:
        (i) a data storage medium for storing commands for operating said functional components,
        (ii) a processor for managing said data storage medium and for executing said commands so as to operate said functional components,
        (iii) a communication interface for reversibly connecting a selected one of said appliances to said data storage and processing device to provide power to said processor from said respective power source of said selected appliance and to allow said processor to operate said respective functional component of said selected appliance, and
        (iv) a data storage and processing device housing, separate from said respective housing of each said appliance, wherein said data storage medium and said processor are housed.

2. The system of claim 1, wherein said respective functional component of one of said appliances is a MP3 decompression circuit for converting digital data stored in MP3 files in said data storage medium to corresponding analog signals, so that if said selected appliance is said one appliance, said selected appliance and said data storage and processing device together constitute a MP3 player.

3. The system of claim 1, wherein said respective functional component of one of said appliances is a microphone for capturing audio signals, and wherein said one appliance also includes a circuit for digitizing and compressing said audio signals to produce digital data to be stored in said data storage medium, so that if said selected appliance is said one appliance, said selected appliance and said data storage and processing device together constitute a digital audio recorder.

4. The system of claim 1, wherein said respective functional component of one of said appliances includes a CCD array for capturing an image and converting said image to a digital representation thereof that is stored in said data storage medium, so that if said selected appliance is said one appliance, said selected appliance and said data storage and processing device together constitute a digital camera.

5. The system of claim 1, wherein, while said selected appliance is connected to said data storage and processing device via said communication interface, said respective functional component of said selected appliance is operated, in response to user instructions, only by said processor.

6. The system of claim 1, wherein said processor receives power only from said respective power source of said selected appliance while said selected appliance is connected to said data storage and processing device via said communication interface.

7. The system of claim 1, wherein each said appliance also includes:
(iv) a respective user interface for entering user instructions; and wherein, while said selected appliance is connected to said data storage and processing device via said communication interface, said processor receives said user instructions from said respective user interface of said selected appliance via said communication interface and operates said respective functional component of said selected appliance in response to said user instructions.

8. The system of claim 7, wherein, while said selected appliance is connected to said data storage and processing device via said communication interface, only said processor operates said respective functional component of said selected appliance in response to said user instructions from said respective user interface of said selected appliance.

9. The system of claim 7, wherein only said appliances include user interfaces.

10. The system of claim 1, wherein each said appliance also includes:
(iv) a respective communication interface; and wherein said communication interface of said data storage and processing device reversibly connects to said selected appliance at said respective communication interface of said selected appliance.

11. The system of claim 10, wherein said respective communication interface of each said appliance and said communication interface of said data storage and processing device all include respective USB connectors.

12. The system of claim 1, comprising a single said data storage and processing device.

13. The system of claim 1, wherein said communication interface is universal.

14. The system of claim 1, wherein said data storage medium includes at least one flash memory module.

15. The system of claim 1, wherein the data and storage device is operative to receive said commands from a software loading device via said communication interface.

16. A system comprising:
(a) a plurality of appliances, each said appliance including:
(i) a respective functional component,
(ii) a respective user interface for entering user instructions, and
(iii) a respective appliance housing wherein said respective functional component and said respective user interface are housed;
each said functional component being different from any other said functional component; and
(b) a data storage and processing device, consisting of:
(i) a data storage medium for storing commands for operating said functional components,
(ii) a processor for managing said data storage medium and for executing said commands so as to operate said functional components,
(iii) a communication interface for reversibly connecting a selected one of said appliances to said data storage and processing device to send said user instructions from said respective user interface of said selected appliance to said processor and to allow said processor to operate said respective functional component of said selected appliance in response to said user instructions; and
(iv) a data storage and processing device housing, separate from said respective housing of each said appliance, wherein said data storage medium and said processor are housed.

17. The system of claim 16, wherein said respective functional component of one of said appliances is a MP3 decompression circuit for converting digital data stored in MP3 files in said data storage medium to corresponding analog signals, so that if said selected appliance is said one appliance, said selected appliance and said data storage and processing device together constitute a MP3 player.

18. The system of claim 16, wherein said respective functional component of one of said appliances is a microphone for capturing audio signals, and wherein said one appliance also includes a circuit for digitizing and compressing said audio signals to produce digital data to be stored in said data storage medium, so that if said selected appliance is said one appliance, said selected appliance and said data storage and processing device together constitute a digital audio recorder.

19. The system of claim 16, wherein said respective functional component of one of said appliances includes a CCD array for capturing an image and converting said image to a digital representation thereof that is stored in said data storage medium, so that if said selected appliance is said one appliance, said selected appliance and said data storage and processing device together constitute a digital camera.

20. The system of claim 16, wherein, while said selected appliance is connected to said data storage and processing device via said communication interface, only said processor operates said functional component of said selected appliance in response to said user instructions from said respective user interface of said selected appliance.

21. The system of claim 16, wherein each said appliance also includes:
(iv) a respective power source; and wherein, while said selected appliance is connected to said data storage and processing device via said communication interface, said processor receives power from said respective power source of said selected appliance via said communication interface.

22. The system of claim 21, wherein, while said selected appliance is connected to said data storage and processing device via said communication interface, said processor receives power only from said respective power source of said selected appliance.

23. The system of claim 16, wherein each said appliance also includes:
(iv) a respective communication interface; and wherein said communication interface of said data storage and processing device reversibly connects to said selected appliance at said respective communication interface of said selected appliance.

24. The system of claim 23, wherein said respective communication interface of each said appliance and said communication interface of said data storage and processing device all include respective USB connectors.

25. The system of claim 16, comprising a single said data storage and processing device.

26. The system of claim 16, wherein said communication interface is universal.

27. The system of claim 16, wherein only said appliances include user interfaces.

28. The system of claim 16, wherein said data storage medium includes at least one flash memory module.

29. The system of claim 16, wherein the data storage and processing device is operative to receive said commands from a software loading device via said first communication interface.

30. A system comprising:
(a) a plurality of functional components;
(b) a plurality of appliances, each said appliance including:
  (i) at least one respective said functional component,
  (ii) a respective power source, and
  (iii) a respective appliance housing wherein said respective at least one functional component and said respective power source are housed; and
(b) a data storage and processing device, consisting of:
  (i) a data storage medium for storing commands for operating said functional components,
  (ii) a processor for managing said data storage medium and for executing said commands so as to operate said functional components,
  (iii) a communication interface for reversibly connecting a selected one of said appliances to said data storage and processing device to provide power to said processor from said respective power source of said selected appliance and to allow said processor to operate said respective functional component of said selected appliance, and
  (iv) a data storage and processing device housing, separate from said respective housing of each said appliance, wherein said data storage medium and said processor are housed.

31. The system of claim 30, comprising a single said data storage and processing device.

32. The system of claim 30, wherein said communication interface is universal.

33. The system of claim 30, wherein each said appliance also includes:
  (iv) a respective user interface for entering user instructions; wherein, while said selected appliance is connected to said data storage and processing device via said communication interface, said processor receives said user instructions from said respective user interface of said selected appliance via said communication interface and operates said respective functional component of said selected appliance in response to said user instructions;
and wherein only said appliances include user interfaces.

34. A system comprising:
(a) a plurality of functional components;
(b) a plurality of appliances, each said appliance including:
  (i) at least one respective said functional component,
  (ii) a respective user interface for entering user instructions, and
  (iii) a respective appliance housing wherein said respective at least one functional component and said respective user interface are housed; and
(b) a data storage and processing device, consisting of:
  (i) a data storage medium for storing commands for operating said functional components,
  (ii) a processor for managing said data storage medium and for executing said commands so as to operate said functional components,
  (iii) a communication interface for reversibly connecting a selected one of said appliances to said data storage and processing device to send said user instructions from said respective user interface of said selected appliance to said processor and to allow said processor to operate said respective functional component of said selected appliance in response to said user instructions; and
  (iv) a data storage and processing device housing, separate from said respective housing of each said appliance, wherein said data storage medium and said processor are housed.

35. The system of claim 34, comprising a single said data storage and processing device.

36. The system of claim 34, wherein said communication interface is universal.

37. The system of claim 34, wherein only said appliances include user interfaces.

38. A system comprising:
(a) at least two different appliances selected from the group consisting of an MP3 player, a digital audio recorder and a digital camera, said MP3 player including, as a respective functional component thereof, an MP3 decompression circuit, said digital audio recorder including, as respective functional components thereof, a microphone for capturing audio signals and a circuit for digitizing said audio signals, said digital camera including, as respective functional components thereof, a mechanism for capturing an image and converting said image to a digital representation thereof and a circuit for compressing said digital image, each said appliance also including:
  (i) a respective power source, and
  (ii) a respective appliance housing wherein said at least one respective functional component and said respective power source are housed; and
(b) a data storage and processing device, including:
  (i) a data storage medium for storing commands for operating said functional components,
  (ii) a processor for managing said data storage medium and for executing said commands so as to operate said functional components,
  (iii) a communication interface for reversibly connecting a selected one of said appliances to said data storage and processing device to provide power to said processor from said respective power source of said selected appliance and to allow said processor to operate said respective functional component of said selected appliance, and
  (iv) a data storage and processing device housing, separate from said respective housing of each said appliance, wherein said data storage medium and said processor are housed.

39. A system comprising:
(a) at least two different appliances selected from the group consisting of an MP3 player, a digital audio recorder and a digital camera, said MP3 player including, as a respective functional component thereof, an MP3 decompression circuit, said digital audio recorder including, as respective functional components thereof, a microphone for capturing audio signals and a circuit for digitizing said audio signals, said digital camera including, as respective functional components thereof, a mechanism for capturing an image and converting said image to a digital representation thereof and a circuit for compressing said digital image, each said appliance also including:
  (i) a respective user interface for entering user instructions, and (ii) a respective appliance housing wherein said respective functional component and said respective user interface are housed; and (b) a data storage and processing device, including:
(i) a data storage medium for storing commands for operating said functional components,
(ii) a processor for managing said data storage medium and for executing said commands so as to operate said functional components,
(iii) a communication interface for reversibly connecting a selected one of said appliances to said data storage and processing device to send said user instructions from said respective user interface of said selected appliance to said processor and to allow said processor to operate said respective functional component of said selected appliance in response to said user instructions; and a data storage and processing device housing, separate from said respective housing of each said appliance, wherein said data storage medium and said processor are housed.

\* \* \* \* \*

UNITED STATES PATENT AND TRADEMARK OFFICE
CERTIFICATE OF CORRECTION

PATENT NO. : 7,035,949 B2
APPLICATION NO. : 10/206117
DATED : April 25, 2006
INVENTOR(S) : Eyal Bychkov et al.

It is certified that error appears in the above-identified patent and that said Letters Patent is hereby corrected as shown below:

Title Page
(73) Assignee: M-Systems Flash Disk Pioneers Ltd.

Column 13
Line 5, Claim 29, delete "first"

Signed and Sealed this

Twenty-first Day of November, 2006

JON W. DUDAS
*Director of the United States Patent and Trademark Office*